3,202,441
TORSION SPRING VEHICLE SUSPENSION
Clark A. Tea, Southfield, Mich., assignor to Ford Motor Company, Dearborn, Mich., a corporation of Delaware
Filed Nov. 27, 1963, Ser. No. 326,603
10 Claims. (Cl. 280—124)

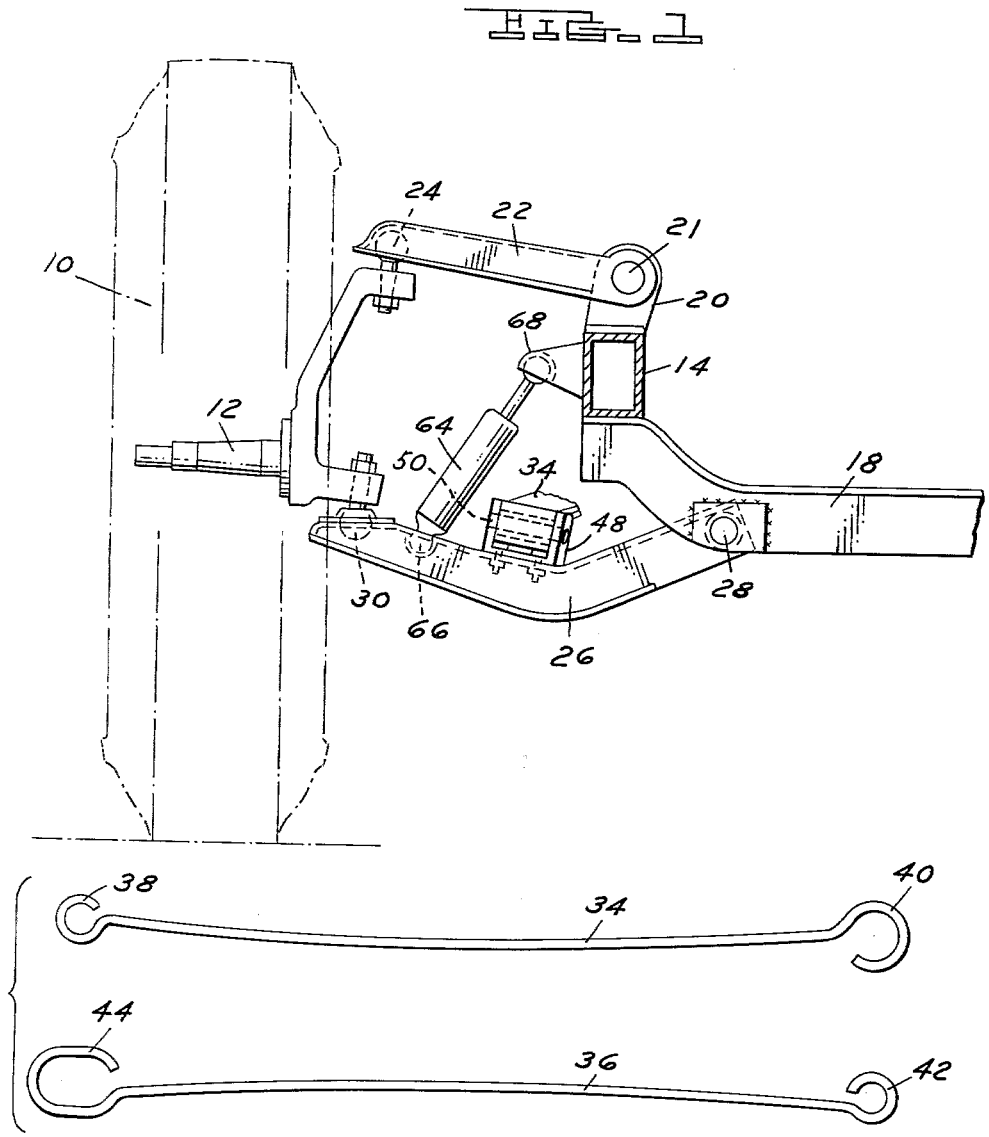

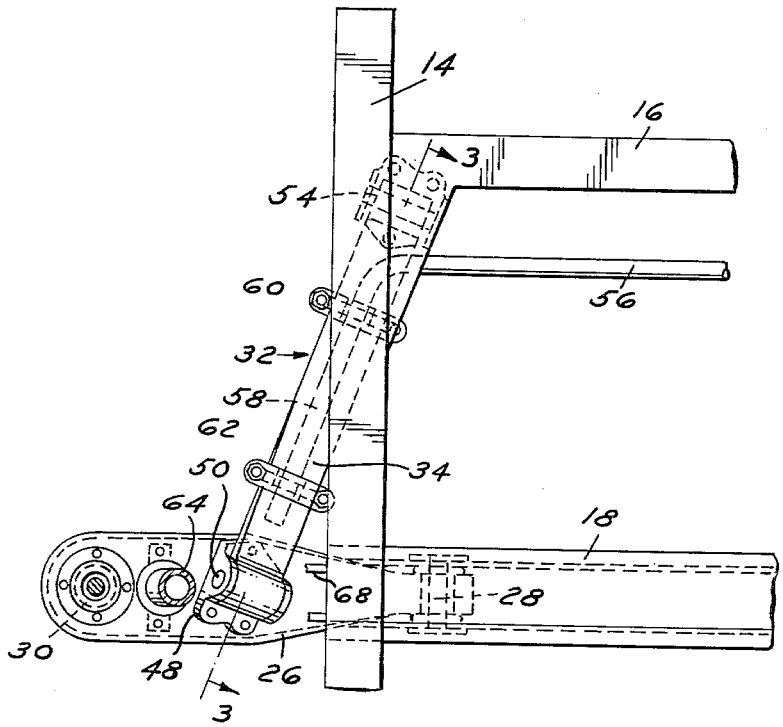
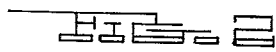
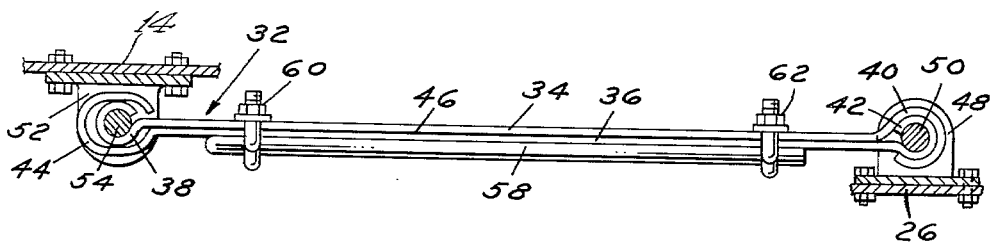

The present invention relates generally to motor vehicle suspension systems, and more particularly to independent suspensions of the torsion spring type.

This invention, when incorporated in an independent suspension, comprehends a torsion spring that serves a plurality of functions. In one embodiment of the invention, one or more flat torsion bar springs interconnect a vehicle frame member and a suspension arm such as the lower control arm of an independent front suspension. In addition to providing a vertical spring action during jounce and rebound movement, the flat torsion spring also serves as a strut member and as a roll bar attachment arm.

The many advantages and objects of the present invention will be fully appreciated upon consideration of the following discussion and the accompanying drawings, in which:

FIGURE 1 is a rear elevational view of an independent suspension for a motor vehicle that incorporates the present invention;

FIGURE 2 is a top plan view of a portion of the suspension disclosed in FIGURE 1;

FIGURE 3 is a sectional view taken along section lines 3—3 of FIGURE 2; and

FIGURE 4 is a detailed view of the elements of the torsion spring.

Referring now to the drawings for a complete disclosure of the presently preferred embodiment of this invention, FIGURE 1 illustrates an independent suspension such as might be used in a passenger automobile. The suspension of that view includes a wheel 10 that is rotatably mounted on a wheel support member 12. The chassis of the vehicle includes a frame side rail 14, a number one cross member 16 and a number two cross member 18.

Suspension means are provided for connecting the wheel support member 12 to the frame components. An upstanding bracket 20 is welded to the top side of the side rail 14. Bracket 20, in conjunction with a bushing 21, pivotally supports an upper suspension arm 22. The outer end of the arm 22 is connected to the wheel support member 12 by a ball joint assembly 24.

A lower suspension arm 26 is provided and has an inner end pivotally connected to the cross member 18 by a rubber bushing 28. The outer end of the arm 26 is joined to the wheel support member 12 by a ball joint assembly 30.

The upper and lower arms 22, 26 provide an articulated connection between the frame members 14, 18 and the wheel support member 12. With this arrangement, the wheel 10 may traverse a vertical jounce and rebound path in a conventional fashion.

It will be noted from FIGURE 2 that the inner pivot bushing 28 for the lower arm 26 is relatively narrow and of the resilient type. With this arrangement, means must be provided to control and position the arm 26 longitudinally with respect to the vehicle chassis. For this purpose, a torsion spring assembly 32 is interposed between the frame member 14 and the arm 26, and arranged at an angle so that it can absorb longitudinal forces resulting from braking and impact by the wheel 10 with road obstacles.

The spring assembly 32 comprises a pair of spring elements 34 and 36 as disclosed in FIGURE 4. Spring element 34 is fabricated from flat leaf spring stock and has one end formed with a small spring eye 38 and another end with a larger spring eye 40. The main portion of the spring element 34 is bowed. In a complementary fashion, spring element 36 has a small eye 42 at one end and a large eye 44 at its other end. Spring element 36 is bowed in a direction opposed to the bow of element 34.

The spring elements 34 and 36 are assembled and interconnected to form the single spring assembly 32. During the assembly operation, the small eye 42 is fitted within the larger eye 40 and the small eye 38 is located within the large eye 44. When the spring elements 34, 36 are interconnected the bowed portions are straightened out to provide a preload that serves to keep the elements assembled. A rubber layer 46 may be interposed between the spring leaves 34, 36 to reduce friction and dampen vibrations.

The large eye 44 of leaf spring 36 has an elongated configuration to accommodate the small eye 38. This arrangement permits slight differences in the length of springs 34 and 36 resulting from manufacturing tolerances.

A pivot bracket 52 is bolted to the frame member 14 near its connection with cross frame member 16. A bushing 54 pivotally connects the inner end of the torsion spring assembly 32 to the bracket 52 and thus to the chassis. A bracket 48 carries a bushing 50 which pivotally connects the outer end of the spring assembly 32 to the arm 26.

With this construction, when the arm 26 pivots about its bushing 28 during jounce and rebound movement of the wheel 10, the spring 32 will be twisted. The tendency of the spring 32 to straighten out and resist twisting provides the force for resiliently supporting the vehicle chassis upon the wheel and related suspension.

The torsion spring 32 is provided with eyes on either end so that it will be loaded in torsion and will not be subjected to bending loads. The center of the bushing 50 is located on a line joining the center of the ball 30 and the bushing 28. This alignment provides a proper distribution of forces and tends to prevent the arm 26 from twisting.

FIGURES 1 and 2 illustrate the suspension for the left side of the vehicle. A similar arrangement is provided on the right side. It is conventional in independent front suspension systems to interconnect the left and right suspension arms by an anti-away or roll bar. The roll bar functions as a torsion spring and increases the spring rate when one wheel is moving in jounce and the other in rebound which occurs during body roll.

In the suspension of this invention, a torsion type roll bar 56 has a torsional segment that extends transversely of the vehicle just rearwardly of the number one cross member 16. The left end 58 of the bar 56 is bent at an angle parallel to the inclination of the torsion spring 32. A pair of U-bolts 60, 62 secure the roll bar end 58 to the torsion spring assembly 32.

The suspension is completed by the addition of a telescopic hydraulic shock absorber 64. Shock absorber 64 has its lower end pivotally connected to the lower suspension arm 26 as indicated by the reference numeral 66. The piston rod of the shock absorber 64 is pivotally connected to a frame bracket 68. Jounce and rebound movement of the arm 26 will cause the shock absorber 64 to function in a conventional fashion.

It can be seen from the foregoing description that the spring assembly 32 performs several vital functions. Firstly, the spring 32 functions as a torsion bar spring to resiliently support the chassis upon the suspension arm 26 and wheel 10. Secondly, the spring 32 positions the arm 26 and absorbs longitudinal forces such as occurr during braking. Thirdly, the torsion spring 32 provides an attaching device for securing the end of the roll bar 56.

Modifications and alterations of this invention will occur to those skilled in the art that will come within the scope and spirit of the following claims:

What is claimed as new is:

1. A vehicle suspension system comprising a chassis frame, a road wheel, a support member rotatably supporting said road wheel, a first suspension arm pivotally interconnecting said support member and said frame, a second suspension arm pivotally connecting said support member and said frame, a suspension spring interposed between said frame and one of said arms, said spring comprising a torsional member formed of flat leaf spring stock with an eye portion at each of its ends, said ends being pivotally connected to said chassis and said one arm respectively, a torsion type roll bar having an end running generally parallel to said spring and secured to said spring.

2. A vehicle suspension system comprising a chassis frame, a road wheel, a support member rotatably supporting said road wheel, a suspension arm interconnecting said support member and said frame, a suspension spring interposed between said frame and said arm, said spring comprising a torsional member formed of flat leaf spring stock with its ends pivotally connected to said chassis frame and said one arm respectively.

3. A vehicle suspension system comprising a chassis frame, a road wheel, a support member rotatably supporting said road wheel, a first suspension arm pivotally interconnecting said support member and said frame, a second suspension arm pivotally connecting said support member and said frame, a suspension spring interposed between said frame and one of said arms, said spring comprising a torsional member formed of flat leaf spring stock and having its ends pivotally connected to said chassis and said one arm respectively.

4. A vehicle suspension system comprising a chassis frame, a road wheel, a support member rotatably supporting said road wheel, a first suspension arm pivotally interconnecting said support member and said frame, a second suspension arm pivotally connecting said support member and said frame, a suspension spring interposed between said frame and one of said arms, said spring comprising a torsional member formed of flat leaf spring stock with an eye portion at each of its ends, said ends being pivotally connected to said chassis and said one arm respectively.

5. A vehicle suspension system having a wheel, a wheel support member rotatably supporting said wheel, a chassis frame, an upper arm having a pivotal connection at its inner end with said frame and a pivotal connection at its outer end with said wheel support member, a lower suspension arm having a pivotal connection with said frame at its inner end and a pivotal connection at its outer end with said wheel support member, a suspension spring interposed between said frame and said lower suspension arm, said spring comprising a pair of overlapping leaf spring elements, said spring having a pivotal connection at its inner end with said frame and a pivotal connection at its outer end with said arm, a torsional type roll bar having an end portion generally parallel to said spring, clamping means securing said end to said spring.

6. A vehicle suspension system having a wheel, a wheel support member rotatably supporting said wheel, a chassis frame, a suspension arm having a pivotal connection to said frame at its inner end and a pivotal connection to said wheel support member at its outer end, an elongated leaf spring means interposed between said frame and said suspension arm, said spring means having a pivotal connection at its inner end with said frame and a pivotal connection at its outer end with said arm, the pivot axis between said suspension arm and said frame being arranged at an acute angle to the pivot axis between said spring means and said frame when viewed in the plan view.

7. A vehicle suspension system having a wheel, a wheel support member rotatably supporting said wheel, a chassis frame, a suspension arm having a pivotal connection to said frame at its inner end and a pivotal connection to said wheel support member at its outer end, a suspension spring interposed between said frame and said suspension arm, said spring comprising a pair of overlapping leaf spring elements, said spring having a pivotal connection at its inner end with said frame and a pivotal connection at its outer end with said arm, a torsional type roll bar having an end portion generally parallel to said spring, clamping means securing said end to said spring.

8. A vehicle suspension system having a wheel, a wheel support member rotatably supporting said wheel, a chassis frame, a suspension arm having a pivotal connection to said frame at its inner end and a pivotal connection to said wheel support member at its outer end, a spring interposed between said frame and suspension arm, said spring comprising a pair of leaf spring elements having interlocking ends, said spring having a pivotal connection at its inner end with said frame and a pivotal connection at its outer end with said arm.

9. A vehicle suspension system having a wheel, a wheel support member rotatably supporting said wheel, a chassis frame, a suspension arm having a pivotal connection to said frame at its inner end and a pivotal connection to said wheel support member at its outer end, a suspension spring interposed between said frame and said suspension arm, said spring comprising a pair of overlapping leaf spring elements having interlocking ends, said elements having body portions that are longitudinally bowed in opposite directions, said spring having a pivotal connection at its inner end with said frame and a pivotal connection at its outer end with said arm.

10. A vehicle suspension system having a wheel, a wheel support member rotatably supporting said wheel, a chassis frame, a laterally extending suspension arm member having a pivotal connection at its inner end to said frame and a pivotal connection at its outer end to said wheel support member, a torsion spring means interposed between said frame and one of said members, said spring means comprising an elongated leaf spring having one end pivotally connected to said frame and the other end pivotally connected to said one member, said elongated spring being arranged at an angle to said laterally extending suspension arm member and to the pivot axis of the inner end of said suspension arm member, the pivot axis between said suspension arm member and said frame being arranged at an angle to the pivot axis between said elongated spring and said frame when viewed in the plan view.

References Cited by the Examiner

UNITED STATES PATENTS

| 2,177,934 | 10/39 | Britton | 280—124 X |
| 3,034,802 | 5/62 | Axtmann | 267—19 X |
| 3,121,561 | 2/64 | Rosenkrands | 267—57 |
| 3,123,348 | 3/64 | Hildebrandt | 280—124 X |
| 3,149,690 | 9/64 | Rosenkrands | 267—57 X |

A. HARRY LEVY, *Primary Examiner.*